US009730020B2

(12) United States Patent
Tomaszewski et al.

(10) Patent No.: US 9,730,020 B2
(45) Date of Patent: Aug. 8, 2017

(54) SYSTEM FOR PROVIDING ON-DEMAND MEDIA CONTENT SERVICES BASED ON GEOLOCATION INFORMATION

(71) Applicant: ProxyPics Inc., Chicago, IL (US)

(72) Inventors: Lukasz Tomaszewski, Chicago, IL (US); Louis Phillip Meadows, San Jose, CA (US)

(73) Assignee: ProxyPics Inc., Chicago, IL (US)

( * ) Notice: Subject to any disclaimer, the term of this patent is extended or adjusted under 35 U.S.C. 154(b) by 0 days.

(21) Appl. No.: 15/249,103

(22) Filed: Aug. 26, 2016

(65) Prior Publication Data

US 2017/0064506 A1  Mar. 2, 2017

Related U.S. Application Data

(60) Provisional application No. 62/210,219, filed on Aug. 26, 2015.

(51) Int. Cl.
*H04W 4/00* (2009.01)
*H04W 4/02* (2009.01)
*H04L 29/08* (2006.01)
*G06Q 20/10* (2012.01)

(52) U.S. Cl.
CPC ............ *H04W 4/023* (2013.01); *G06Q 20/10* (2013.01); *H04L 67/1095* (2013.01); *H04W 4/021* (2013.01); *H04L 67/104* (2013.01)

(58) Field of Classification Search
CPC ....... H04W 4/021; H04W 4/02; H04W 4/023; H04W 64/00; H04W 4/043; H04W 4/18; H04W 64/006; H04W 4/206; H04W 88/02; H04L 41/0816; H04L 67/104; H04L 67/18; H04L 67/306; H04L 51/20; H04L 67/02; H04L 67/1095; G06F 17/30241; G06F 17/30554; G06F 21/35
See application file for complete search history.

(56) References Cited

U.S. PATENT DOCUMENTS

| 9,043,222 | B1 * | 5/2015 | Kerr | G06Q 30/0621 |
| | | | | 705/14.58 |
| 9,460,057 | B2 * | 10/2016 | Grossman | G06F 17/212 |
| 2015/0026785 | A1 * | 1/2015 | Soon-Shiong | G06Q 30/0207 |
| | | | | 726/7 |
| 2015/0350351 | A1 * | 12/2015 | Tung | H04L 67/18 |
| | | | | 709/204 |

\* cited by examiner

*Primary Examiner* — Olumide T Ajibade Akonai
(74) *Attorney, Agent, or Firm* — Fountainhead Law Group P.C.

(57) ABSTRACT

Embodiments described in this disclosure include an application that connects users and media content providers to request on-demand media content services in a network based on geolocation information for media content capture and delivery. The techniques described in this disclosure can be adapted to provide an on-demand media content service that can facilitate establishing a large vendor network of media content providers (e.g., freelance photographers) with mobile devices configured to accept requests from users of the system for various entities of media content such as photo, video, and/or audio. Embodiments of this disclosure can be leveraged in a variety of different contexts where providing on-demand media content services can be valuable.

15 Claims, 12 Drawing Sheets

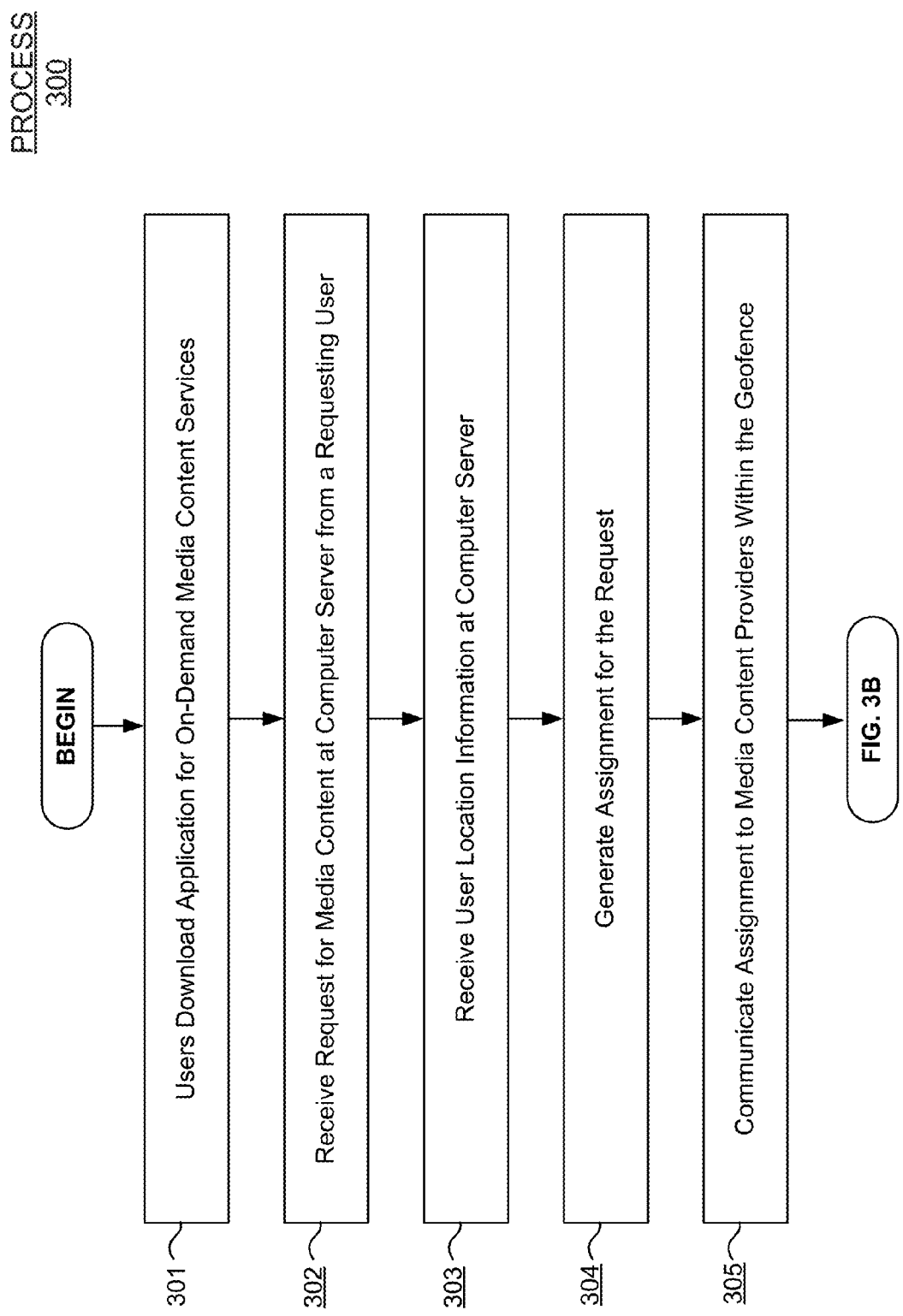

Launch Page 400

Photo Request
Page 402

Photo Assignment
Detail Display Page 500

Assignment Accepted
Page 501

Main Camera
Page 600

Photo Upload
Page 700

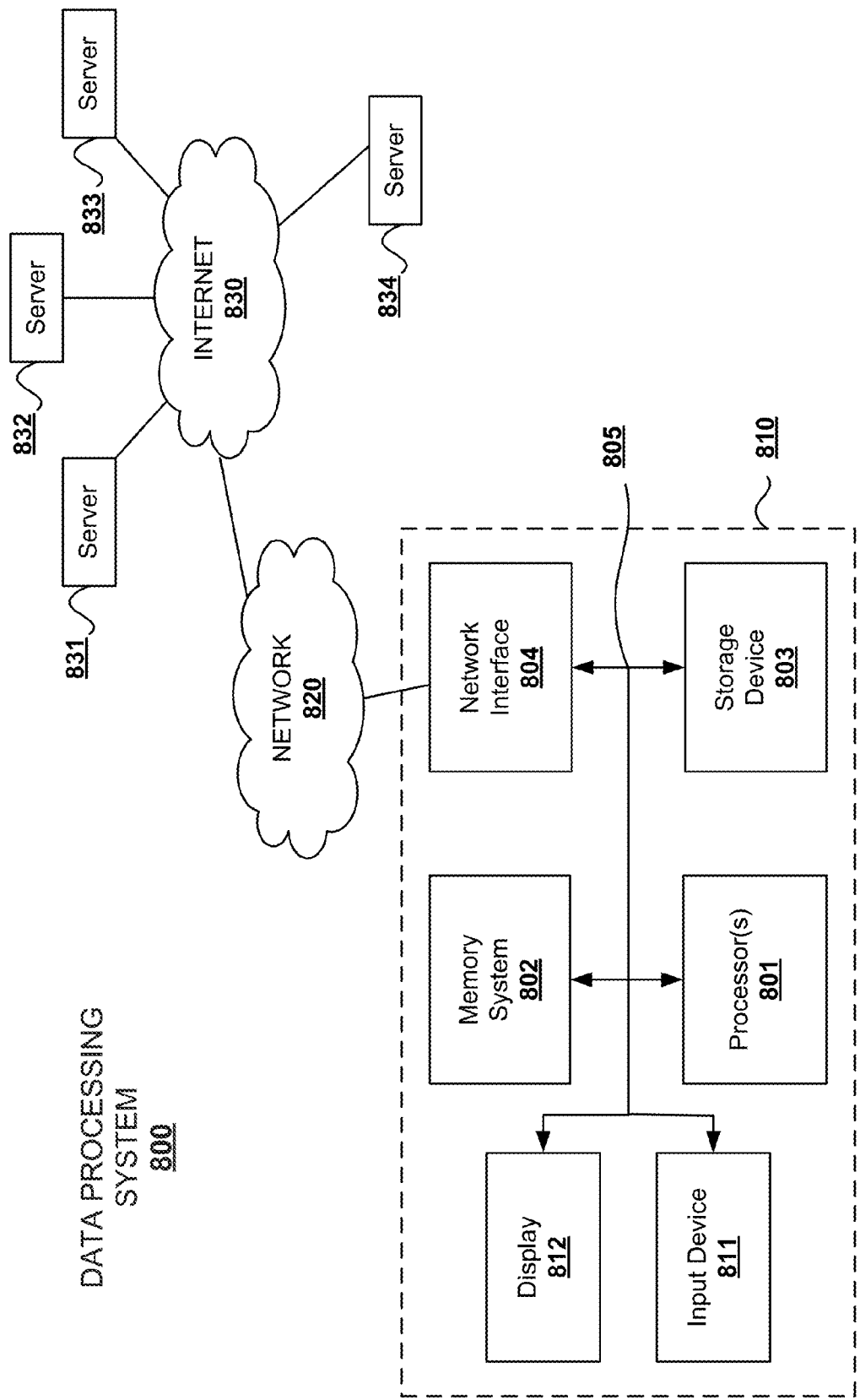

SYSTEM FOR PROVIDING ON-DEMAND MEDIA CONTENT SERVICES BASED ON GEOLOCATION INFORMATION

CROSS-REFERENCE TO RELATED APPLICATIONS

This patent application claims priority to and incorporates by reference U.S. Provisional Patent Application No. 62/210,219 entitled "A Software Application that Connects Customers and Vendors to Request and Provide Real Time Photos/Videos of Anything, Anytime, Anywhere" filed on Aug. 26, 2015.

TECHNICAL FIELD

The embodiments described in this disclosure relate generally to media content data processing and delivery systems, and more particularly to on-demand media content services based on geolocation information.

BACKGROUND

In today's fast-paced environment the need for speedy and reliable information is at an all-time high. There is a need for on-demand services relating to providing media content, such as pictures, photos, and/or video or audio, in a timely manner. Currently there is no solution obtaining photos (or other media content) of physical properties or landmarks in a time efficient manner on an on-demand basis. If a photo or video is needed that reflects the actual current conditions of a particular geographic location, property, landmark, scene, etc., it can be difficult to obtain one using existing technology. A person must either travel out to the location to capture the media, or, alternatively, the person can resort to satellite imagery and/or mobile mapping applications, but this is very inefficient and the images often lack the detail needed and may be dated as well.

SUMMARY

The embodiments described in this disclosure include improved systems and methods for providing on-demand media content services in a network using location services for media content capture and delivery.

The following detailed description and accompanying drawings provide a better understanding of the nature and advantages of the present disclosure.

BRIEF DESCRIPTION OF THE DRAWINGS

For a better understanding of the embodiments described in this disclosure, reference is made to the following detailed description, which is to be read in conjunction with the accompanying drawings.

FIG. 3A depicts a flow chart of an example embodiment of a process for providing on-demand media content services in accordance with the techniques described in this disclosure.

FIG. 8 depicts an example overview block diagram of a data processing system upon which the embodiments described in this disclosure may be implemented.

DETAILED DESCRIPTION

Figure 1:
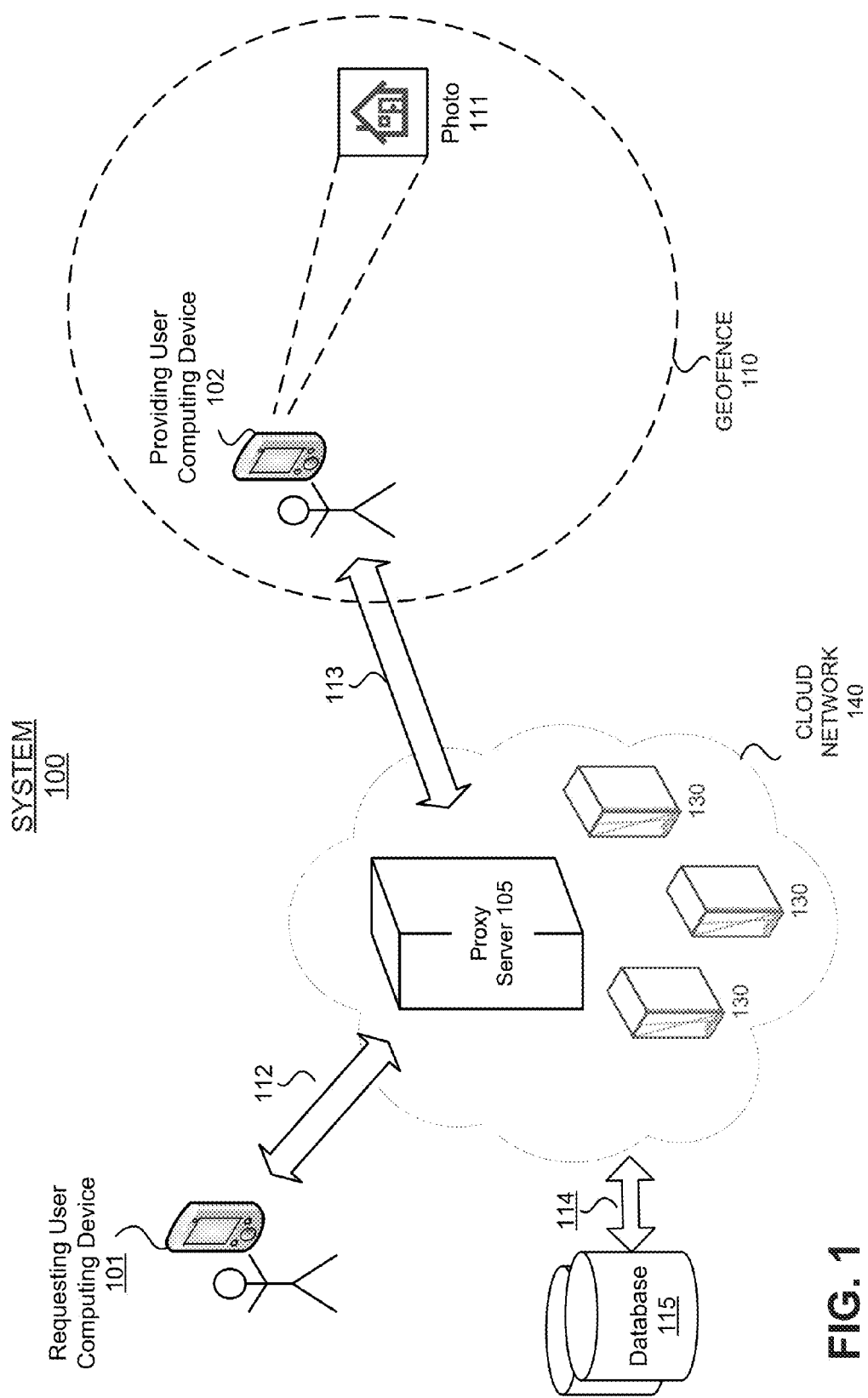
FIG. 1 depicts a conceptual overview block diagram of an example embodiment of a system for providing on-demand media content services in accordance with the techniques described in this disclosure.

Throughout the description, for the purposes of explanation, numerous specific details are set forth in order to provide a thorough understanding of the present disclosure. It will be apparent to one skilled in the art, however, that the techniques described in this disclosure may be practiced without some of these specific details. In other instances, well-known structures and devices may be shown in block diagram form to avoid obscuring the underlying principles of the techniques described in this disclosure.

The disclosed embodiments provide for improved methods, systems and computer readable media adapted to enable on-demand capture and delivery of media content in a network based on geolocation information. In one embodiment, the network can be a cloud network. The techniques described in this disclosure can be adapted to provide an on-demand media content service that can facilitate establishing a large vendor network of media content providers (e.g., freelance photographers) with mobile devices configured to accept requests from users of the system for procuring various entities of media content such as photo, video, and/or audio.

For example, if a user requests a photo of a property at 123 Main Street and is willing to pay for this photo, a request can be processed via a mobile application for on-demand media content services running on the user's computing device, such as a mobile device, and this request can ping a network of media content providers (e.g., photographers and/or videographers) that are located within a pre-selected or user-specifiable proximity to the property. The media content provider can be offered a fee of $10, for example, to capture the photo and upload it via the mobile application. A transaction fee for the on-demand services can then be deducted from this using the system. The requesting user can then be provided with the photo of the subject property at 123 Main Street. The requesting user can be an individual who, for example, is on vacation and would like to see a picture of his or her home to make sure it is secure, as well as large lending institutions whose business involves requesting photos of properties for an entire portfolio of 2,000 properties.

Embodiments of this disclosure can be leveraged in a variety of different contexts where providing on-demand media content services can be valuable. For example, in the archaeology context, a user in Chicago may want a photo of one or more of the pyramids in Egypt and have it provided by a photographer within a specifiable area (e.g. geofence) surrounding the subject matter pyramids using the on-demand media content services described in this disclosure.

Other contexts can include requests by news agencies for certain live photo and/or video media content for breaking news during a particular news event such as a protest. In yet other examples, media content provided by the on-demand services described in this disclosure can be used as proof of project completion, for example, by a general contractor or other service provider. The general contractor can receive photo or video media content from the subcontractors after completion of a particular project via the system.

Once a request for specified media content has been processed, the application can also verify the address or landmark of the subject matter property via alternate data sources, such as the United States Postal Service, to ensure the validity of the subject matter of the media content. Additional verification sources can be added to verify the correct address, for example, verification via an additional street view option in a mapping application to cross-check photo that was provided. The geolocator/GPS function on a mobile device can also ensure the correct photo has been taken.

Once a request has been verified, the request can be communicated onto a network of mobile media content providers for assignment, acceptance, and fulfillment of the request.

In one embodiment, the system described in this disclosure may operate as an exchange for media content, and can interface with one or more payment processing services to complete transactions. There may be a transaction fee associated with the transaction from the on-demand services between the media content requesting users and the media content providing users in the exchange for the requested media content. At least certain embodiments may be configured to integrate with standard payment systems for payment processing such as Visa, MasterCard, PayPal, Apple pay, Google wallet, Samsung pay, etc., or any other payment processor or payment processing mechanism.

I. Illustrative Systems

Provided below is a description of example systems upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

FIG. 1 depicts a conceptual overview block diagram of an example embodiment of a system for providing on-demand media content services in accordance with the techniques described in this disclosure. In the illustrated embodiment, system 100 includes a proxy server 105 in a cloud network 140 that facilitates communications between the requesting user mobile device 101 and the media content providing users' computing device(s) 102. The cloud network 140 may comprise various additional servers 130 that can be utilized on an on-demand basis to enable the system to scale as more simultaneous users logon to the system. The servers 105/130 in the cloud network 140 may also communicate with one or more databases 115 via one or more communication networks or links 114.

The requesting user computing device 101 can communicate with the proxy server 105 via one or more communication networks or links 112. The requesting user mobile device 101 can send requests to the proxy server 105 to be provided with one or more entities of media content (e.g. pictures, photos, videos and/or audio). The proxy server 105 can generate an assignment to fulfill the request. The proxy server 105 can then can notify a network of media content providing user computer devices 102 of the assignment for acceptance and fulfillment of the request via one or more communication networks or links 113.

Any providing user computing devices 102 within the designated geofence 110 surrounding the subject matter property for the requested media content (e.g., photo 111) can potentially be notified of the assignment via network 113. The requesting users can pre-select or specify the geofence surrounding the subject matter (e.g., physical property) for the request. Alternatively, a default geofence area can be stored in the requesting user computing device 101 and used for fulfilling the request. Users who are within the designated geofence and have the appropriate characteristics (e.g., ratings, credentials, etc.) are able to view certain assignments. Other assignments with no filtering criteria may be viewed by general users as long as they are within the designated geofence area for the assignment.

In one embodiment, a rating system can be provided for users to rate each other. For example, a media content service provider can be rated based on the level in which he or she completed past assignments, or the quality of their work, etc. These ratings can then be used as an additional filtering criteria for the media content providers in the network.

In addition to the geo-fence requirement, the requesting user can specify any number of additional filtering conditions which the providing users must satisfy in order to receive a particular assignment. The requesting users can specify various criteria in the request including a pre-selected or user-specified timeframe for fulfilling the request and other filtering criteria for the request such as filtering providing users on user ratings, certifications, or other specialties required by the content provider users to fulfill the request.

This multi-layer filtering scheme is advantageous for enabling users to customize their requests for media content. For example, the requesting user may specify that the content provider user be a general contractor, with specified certifications, and within a certain geofence surrounding the subject matter property; as well as the timeframe in which the request is to be fulfilled. In one embodiment, providing the requesting users with additional levels of filtering can also be used to evaluate fees for completing the transaction. For example, photos taken by a professional photographer may include enhanced fees in comparison with photos taken by users in a general assignment feed with no particular certifications.

The providing user computing device 102 can then communicate with the proxy server 105 upon acceptance of the assignment. An image, video, and/or audio capture device on the providing user computing device 102 such as a camera can then be used to capture the requested media content entities (photo 111). Photo 111 can then be stored on the providing user computing device 102 and uploaded to the proxy server 105 via communication network 113.

The uploaded media content entities can then be communicated back to the requesting user computing device 101 for review and acceptance. The requesting user can review the quality of the media content entities provided by the providing user and can accept or reject them using the requesting user computing device 101. If the requesting user rejects the media content entities, the providing user computing device 102 can be notified via the proxy server 105. Once the requesting user accepts photo 111, both parties can be notified, and the proxy server 105 can access one or more payment processing services (not shown) for accepting payment and completing the transaction. Further details of the systems and techniques described in this disclosure are set forth below.

Figure 2:
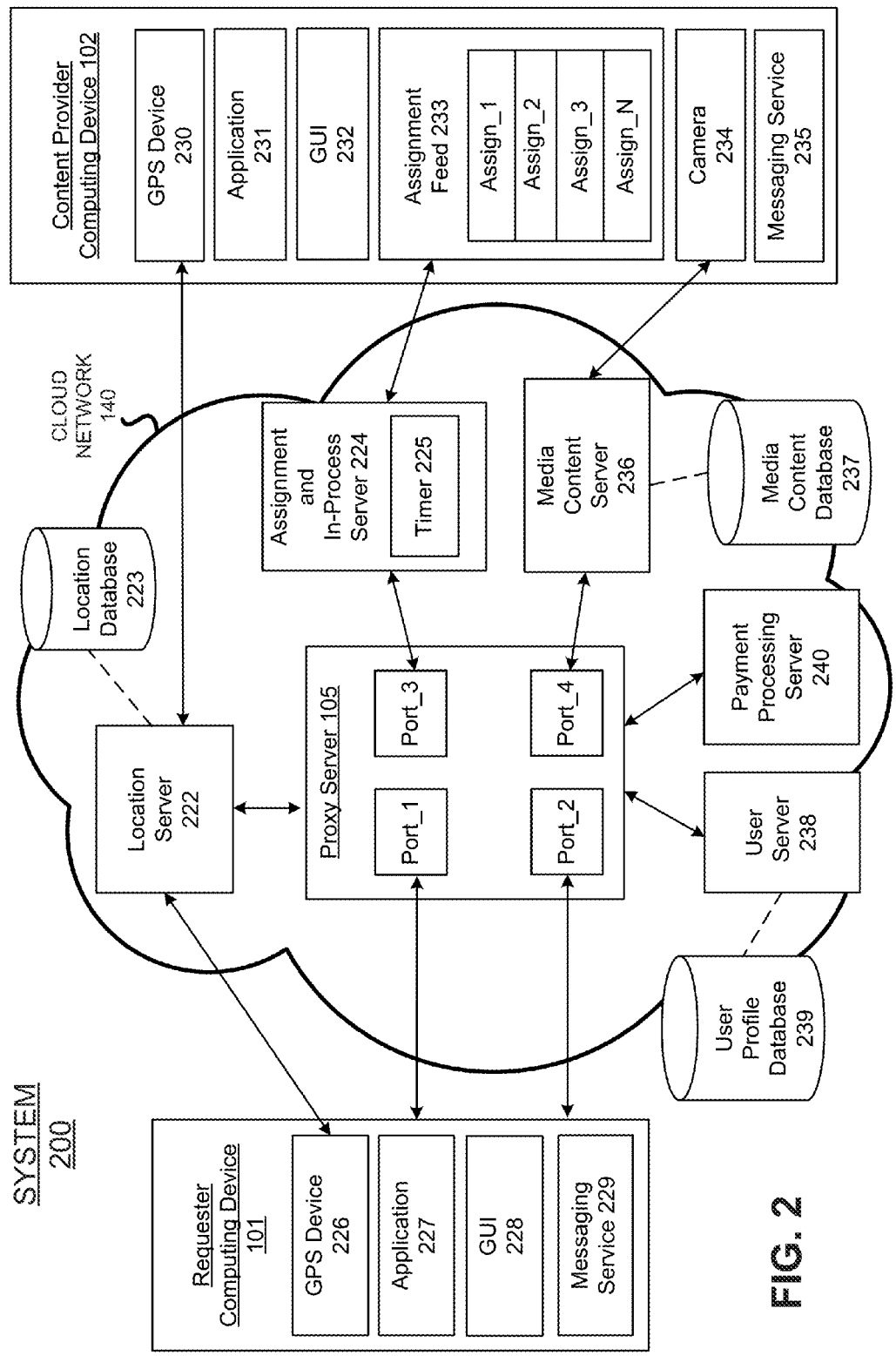
FIG. 2 depicts a conceptual block diagram of an example embodiment of a system for providing on-demand media content services in accordance with the techniques described in this disclosure.

FIG. 2 depicts a conceptual block diagram of an example embodiment of a system for providing on-demand media content services in accordance with the techniques described in this disclosure. In the illustrated embodiment, system 100 includes a requesting computing device 101 in communication with a content provider computing device 102 via cloud network 140. The cloud network 140 depicted in this figure includes a proxy server 105 and a number of other servers/services communicating over one or more networks within the cloud 140. The techniques described in this disclosure may be facilitated by these servers in the cloud network 140 or other network or networks.

Users can download the application that facilitates the on-demand media content services in accordance with the techniques described in this disclosure. The on-demand media content capture and delivery application may comprise computer hardware, computer software, or combination thereof. In the depicted embodiment, the requester computing device 101 includes a global positioning system (GPS) device 226, an on-demand media content services application 227, a graphical user interface (GUI), and a messaging service 229. In the depicted embodiment, the content provider computing device 102 includes a GPS device 230 the on-demand media content services application 231 (corresponding to application 227 on the requester computing device 101), GUI 232, an assignment feed 233, a camera 234 (or other image or video/audio capturing device), and a messaging service 235 corresponding to the messaging service 229 on the requester computing device 101.

In one embodiment, the system 200 identifies and keeps track of the location of each user on the system via one or more networks (e.g., cloud-based networks 140) by periodically receiving data packets containing user identification information sent from the users' computing devices. As shown in the depicted embodiment, the requesting computing device 101 and the content provider computing device 102 communicate with the location server 222 via one or more communication networks or links. GPS information obtained on GPS device 226 of the requester computing device 101 and on GPS device 230 of the content provider computing device 102 can receive geolocation information for the user devices and communicate this information to the location server 222 over the one or more networks or communication links. The location server 222 may receive and store this location information in one or more location databases 223. The location server 222 may also be in communication with the proxy server 105 via one or more communication networks or links.

In the illustrated embodiment, a first port (Port_1) of the proxy server 105 can be used for communicating the user location information. The user location information may be sent to the proxy server 105 via communication link 220 using identifying data packets. In one embodiment, the identifying data packets may comprise Universal Datagram Protocol ("UDP") data packets comprising the user's location ("my_loc") and the identification information ("user_id"). In one embodiment, the first port may be a 7700 port of the proxy server 105 and may comprise a network interface specifically designated to receive location information of users. This feature can assist the system in performing the user location and geofencing operations to determine where the requesting users are in relation to the media content providing users, and further in relation to the subject matter of the location contained in the request.

In one embodiment, the proxy server may advantageously utilize different network interface ports and/or network protocol packets for the user location and identifying information as opposed to the media content requests communicated by users. In one aspect, this enables the system to scale quickly as additional users logon to the system. In one embodiment, UDP packets are used for the user location and identification information because UDP packets are unacknowledged. Using unacknowledged packets on a separate network port of the proxy server 105 can conserve battery life of the users' computing devices 101/102 as the location of the users changes over time and is constantly updated via the mapping application and GPS devices. Battery life is conserved by utilizing UDP packets for some features and IP packets for other features. This is particularly important for scaling as the quantity of users on the system increases over time.

The requester can then send a request for one or more entities of media content to be provided via communication link via a second network port (Port_2) of the proxy server 105 that is different from the first network port. In one embodiment, Internet Protocol (IP) packets can be used for the assignment in the request for the media content. The request can be included in the IP packets, which require acknowledgement. It is noted that IP sessions can consume more transmitter time the UDP, and hence consume more battery power.

The assignment may include the street address of the subject matter property for the assignment. A specific street address may be provided in the IP packets in some cases, and in other cases the street address can be provided using a different location designator such as latitude and longitude coordinates, etc. In one embodiment, requester users 101 can enter an address for the subject location for which on-demand media content is requested by keying in the address text using a keyboard or other data entry device on the requester user computing device 101. In other embodiments, the subject property can be identified in various other ways including, for example, identifying the location by setting up and using a mapping application such as Google Maps. Embodiments can be configured to integrate with any mapping application and users can specify which mapping application to use.

The request may also include a description of the subject matter at the designated address. In one embodiment, the assignments may be bundled and sent to the proxy server 105 as an XML file.

The proxy server 105 may be configured to generate an assignment for the request and store the assignment in system memory and/or one or more databases or other storage mechanisms. The proxy server 105 can then communicate the assignment to all of the content provider computing devices 102 in the network that are located within the designated geo-fence and that satisfy one or more filtering criteria for the assignment that may be specified by the requester. The content provider computing devices 102 that satisfy the criteria can then load the assignment into the application 231 of the content provider computing device 102 and display the assignment in graphical user interface 232.

In the depicted embodiment, the assignment can be communicated via an assignment and in-process server 224. In one embodiment, the assignment and in-process server 224 comprises a single computer hardware server. In other embodiments, the assignment and in-process server 224 can be configured as multiple servers working together in a functionally coordinated manner. In yet other embodiments, the assignment and in-process server 224 can be a service process running on the proxy server 105. The assignment can then be received from the assignment and in-process server 224 and loaded into an assignment feed 223 on the content provider computing device 102. The assignments feed 225 can provide a list of assignments, e.g., assign_1, assign_2, assign_3, assign_N.

In one embodiment, the assignments in the list of assignments in the assignment feed 225 can be listed in the order in which they were received or in some other user-specifiable order. The media content provider user can then browse the list of assignments in the assignment feed 225 and select one of the assignments for fulfillment of the request from the requester computing device 101. In one embodiment, once an assignment is selected by the content provider user, it can be removed from the assignment feed 225. In addition, when a content provider accepts a particular assignment in their assignment feed 225, the selected assignment can be communicated back to the proxy server 105 via the assignment and in-process server 225.

In one embodiment, the notification of acceptance of the assignment by the content provider can be communicated to the proxy server 105 via a third port (Port_3) comprising a separate network interface from network ports 1 and 2 described above. In one embodiment, the third port (Port_3) may be a 8800 port and may comprise a network interface specifically designated to handle assignments in accordance with the techniques described in this disclosure.

In the embodiment illustrated of FIG. 2, the assignment and in-process server 224 includes a timer 225. The timer 225 may be initiated upon acceptance of an assignment by a content provider and used to track the amount of time for the request to be completed and the corresponding transaction(s) to be processed. As discussed above, the requesting user can specify a timeframe in which the request must be completed.

The location server 222 communicates with the content provider computing device 102. In one embodiment, once the content provider computing device 102 receives the user acceptance of an assignment, the location server 222 can be accessed to determine the location of the street address (or longitude/latitude coordinates, etc.) of the subject matter for the assignment. The street address information of the subject matter property can then be communicated to the application 231 on the content provider computing device 102 and displayed in a browser in the GUI 232. The GUI 232 can then display the mapping information for the subject matter property in the browser in a real-time mapping application.

In one embodiment, user trail histories can also be tracked to determine areas or routes in which the user frequents. This information can then be used by the application 227 for requesting users to access when formulating their various requests. For example, if a particular user with a particular characteristic (e.g., a veterinarian in a rural area) is known to follow a certain path or be in a certain location or area at a certain time, this information can be provided to the requesting users in formulating their requests.

Once the assignment is accepted by the content provider computing device 102, the camera 234 on the computing device 102 can be accessed for the content provider to capture the requested entities of media content. After the media content is captured using the camera 234 (or other media capture device), the content provider can accept the captured media or reject and retake the photo and/or video/audio. After acceptance, a notification of the acceptance of the assignment can be communicated back to the requesting user via the assignment and in-process server 224 on the third port Port_3 of the proxy server 105.

The photos and/or video/audio media content can then be uploaded the proxy server 105 on a fourth port (Port_4) via a media content server 236. The fourth port can be designated for only processing media content and can be separate from the other network ports of the proxy server 105. This can be advantageous of scaling purposes in cases when thousands of users in the media content provider network are attempting to upload photos and/or other media content to the system at substantially the same time. Once uploaded, the media content server 236 can store the media content locally on a memory system or can access one or more media content databases 237 for storing and querying the media content. As above, the media content server 236 can be a separate hardware server, a server process running on the proxy server 105, or any combination thereof.

In one embodiment, the media content server 236 can be configured to complete the transaction and bundle multiple entities of media content, etc., as appropriate. For example, an assignment relating to a wedding event may be transacted as one assignment and may be associated with multiple media content entities such as photos and/or videos, etc., which the media content server 236 can bundle together as appropriate before providing the media content to the proxy server 105 via the fourth port Port_4.

The requester computing device 101 can then access the media content from the media content server 236 via Port_4 of the proxy server 105. The requester device 101 can then view the photo and/or other media content entities via the GUI 226 and can accept or reject the media content as desired. The requester computing device 101 can also exchange notes and/or messages with the content provider device via the respective messaging services 229 and 235.

In one embodiment, the proxy server 105 includes a server computer residing in a cloud network 140. In the illustrated embodiment, the proxy server 105 may include the following services as separate computer servers, or as separate server processes running on the proxy server 105, including the location server/service 222 (to listen for locations and obtains location information), the media content server/service 236 (to receive uploaded picture, photo or video media content and to communicate the media content down to the requester computing device 101), and the assignment and in-process server/service 224 (for the assignment handling and acceptances). A user server/service 238 may also be provided as a stand-alone computer hardware server or as a separate service process running on the proxy server 105. The user server/service 238 can be used to access user profile information, to log users on/off of the system, to maintain user information such as certifications and special qualifications, etc. The user server/service 238 may access one or more user profile databases 239 to store and access this information.

Upon requestor approval, a payment processor server 222 can be accessed to provide for payment processing and settlement of the transaction for the requested media content. A service fee may be deducted from the transaction amount to cover the on-demand media content delivery services provided by the system in accordance with the techniques described in this disclosure.

Embodiments of this disclosure can be implemented on any computing device that includes the capability to capture media content, such as a camera, and is able to communicate with other computing devices over one or more networks such as the internet. For example, embodiments may be implemented on a desktop computer a laptop computer, a tablet computer, a mobile phone, smart phone, PDA, etc. In one embodiment, the media content is provided to the server and then to the requesting computing device upon completion of the transaction. The media content can then be stored on the requesting users computing device 101.

In one embodiment, a messaging service or chat service 229/235 can be incorporated into the on-demand media content services to provide communications between the requesting users and the media content providing users for each transaction. For example, requesting users can accept or reject the media content provided, and can utilize the messaging service to facilitate the transaction. Users can provide comments regarding quality of the media content, etc., using the integrated messaging service 229/235. In some cases, this can be beneficial in establishing connections between the requesting users and the media content service provider users. In some cases, the messaging service can capture information that cannot be provided in standard format.

Some media content service provider users can provide specialized services relating to media content. For example, a building inspector user can provide specialized services with respect to taking appropriate pictures needed to obtain, for example, a building permit. The media content service provider users can also be rated by requesting users of the system. The rating system can then be used by other requesting users as a filtering mechanism for the media content service provider users. For example, a requesting user may request media content in a certain geographical area specified by one or more geofences, and can further request that the requested media content only be provided by highly rated service provider users within the geofence(s). Such an embodiment provides one or more additional levels of filtering on the media content service provider users who can fulfill the request. Other layers of filtering can include requesting media content provider users having a certain specialty or certification(s). Some media content service provider users may, for example, professional photographers, building inspectors, commercial contractors, etc. Media content service provider users with certain specialties or certifications can charge a premium fee for completing a transaction within their specialty area, for example.

Geofencing occurs within a pre-selected or user-specified geographic area. Users within the selected geofence that meet the filtering criteria (e.g., specialty, certification, user rating, user preferences) can be notified of and respond to the requests for media content. In one embodiment, the system can provide the requesting user with a list of media content service provider users within the selected geofence that meet the filtering criteria and enable the requesting user to select a particular service provider from the list. The requesting user may also be able to research the service provider users profiles and ratings prior to making a selection. In other embodiments, the user may opt for selection of media content service providers on a "first-come, first-serve" basis or any other basis such as based on user closest to the subject matter media content to be captured. These options are specifiable by the requesting users via the application.

In one embodiment, the rating system can be integrated with the system via social media services. User profiles can be accessible via the social media service(s). Users can be identified by their ratings in their profiles and can post various portfolios of their work, etc. The social media content may be provided, for example, via a website. Bulk orders can be placed with the system in some embodiments via the website.

A time period for providing the requested media content can be specified. In one embodiment, the time period for responding to the request can be pre-selected or specified by the user upon making the request. For example, a photo needed by a user in a certain context may only be valuable if it is received within a particular timeframe. Thus users can specify the timeframe for the media content to be provided.

In one embodiment, photo or video media content for interior area within buildings can be provided via integration with an indoor mapping application that includes such features.

In various embodiments, the proxy server 105 can be configured to perform data accesses operations on data stored in the various databases described in this disclosure via one or more communications networks or links. The proxy server 105, as well as the other servers described in this disclosure, may be implemented as an individual computer hardware server or as an array of computer hardware servers logically coupled together and working in a functionally coordinated manner. Generally, a computer hardware server comprises a system configured to perform data access operations with respect to data stored in one or more repositories of data (e.g., database(s)). Depending on the type of server, data operations may range from simple operations, such as storing and retrieving data, to more complex operations such as calculating statistics based on the data, or arranging, modifying, or formatting data.

In one embodiment, the proxy server 105 may be in remote communication with the databases in this disclosure via one or more communication links or networks. Alternatively, databases may be components of the proxy server 105 and configured to communicate with the proxy server 105 via any direct or indirect connection or network. In addition, the database(s) may be implemented as any type of database system. One example embodiment includes a relational database system in which data is stored in structured database tables (or other data structures) comprised of rows and columns, and accessed through data storage rules (or schemas). Other examples of database systems include database systems where data can be stored in a semi-structured or unstructured format.

As will be appreciated by persons of skill in the art, the various networks or communication links described in this disclosure may be implemented as any single wired or wireless network, or as multiple separate networks in communication with one another. The networks or communication links may be implemented as any wired or wireless network(s). For example, the networks or communication links described herein can be implemented as a local area network ("LAN"), wide-area network ("WAN"), combination of LANs and WANs, the Internet, or any other type of communication network adapted for communicating electronic messages and information. Further, the networks described in this disclosure may be implemented as a physical array of hardware resources or as a virtual array, or any combination thereof. The networks may also be implemented in a cloud-based network configuration. For example, the networks described in this disclosure may be implemented as public or private cloud network, or combination thereof. No specific network or network architecture should be construed as limiting the embodiments and techniques described herein.

II. Illustrative Processes

Figure 3B:
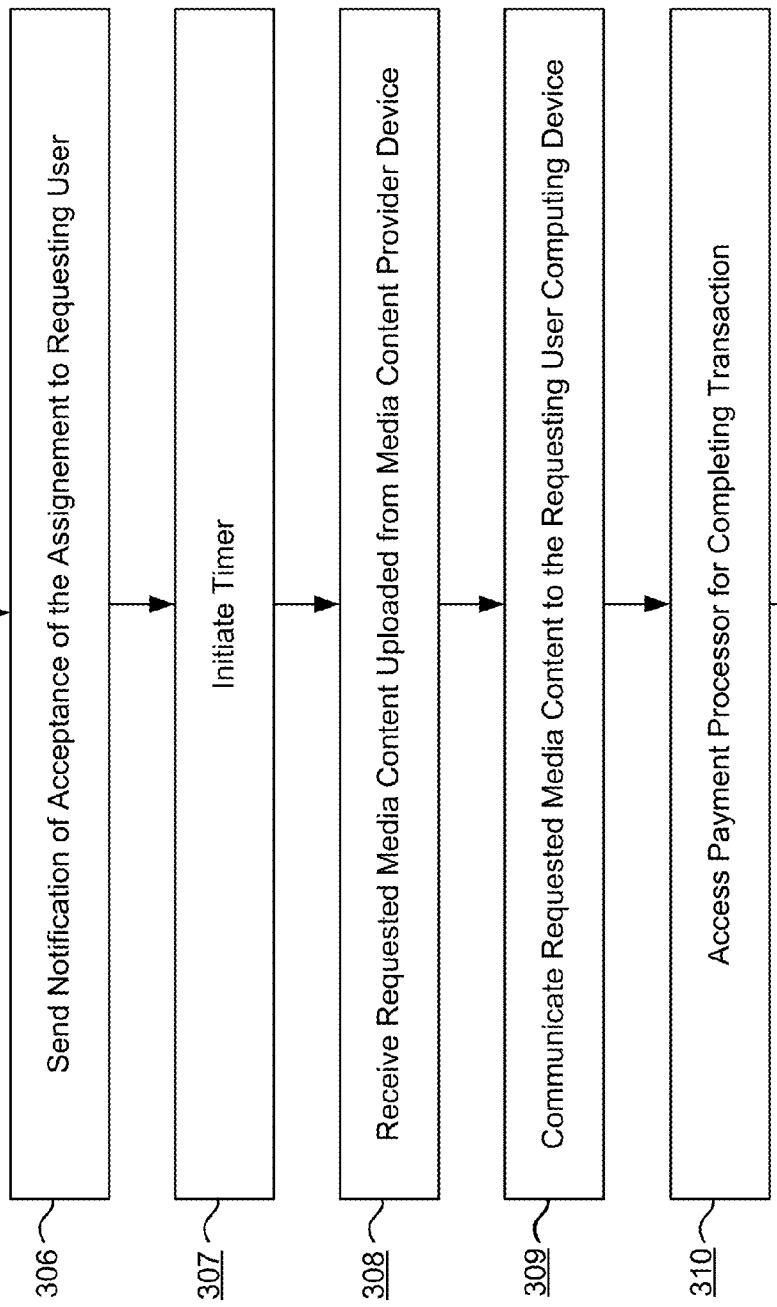
FIG. 3B depicts a flow chart of an example embodiment of a process for providing on-demand media content services in accordance with the techniques described in this disclosure.

FIGS. 3A-3B depict flow charts of an example embodiment of a process for providing on-demand media content services using geolocation information in accordance with the techniques described in this disclosure. The following figures depict example flow charts illustrating various embodiments of a process for modeling event services in an event services framework in accordance with the techniques described in this disclosure. It is noted that the processes described below are exemplary in nature and are provided for illustrative purposes and not intended to limit the scope of the disclosure to any particular example embodiment. For instance, methods in accordance with some embodiments described in this disclosure may include or omit some or all of the operations described below, or may include steps in a different order than described in this disclosure. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

FIG. 3A depicts a flow chart of an example embodiment of a process for providing on-demand media content services in accordance with the techniques described in this disclosure. In the illustrated embodiment, process 300 begins at operation 301 when a user downloads the application software for providing on-demand media content services using geolocation information onto his or her computing device. In at least certain embodiments, the computing devices described herein may be mobile computing devices such as a mobile phone, smartphone, PDA, tablet computer, laptop and the like. In other cases, users may make use of more static computing devices such as desktop computers in certain circumstances.

In one embodiment, the techniques described in this disclosure can be implemented on a computer server in a network, the computer server comprising at least one processor and a memory system in communication with the processor for storing computer code comprising instructions executable by the processor. Process 300 continues by receiving, at a first network interface of the computer server, a request for one or more entities of media content from a user computing device in communication with the computer server via one or more networks using a first protocol (operation 302). In one embodiment, the request includes one or more data packets of a first data packet type corresponding to the first protocol, the data packets of the first protocol including address information of the location of subject matter of the media content. In one embodiment, the request may be sent using IP protocol data packets. In at least certain embodiments the request can include the following information: (1) a geofence selected for the subject matter of the media content, (2) a timeframe in which to complete the request, and (3) one or more filtering criteria for media content providers.

Process 300 continues by receiving, at a second network interface of the computer server, separate from the first network interface, location information of the user computing device via one or more networks using a second protocol (operation 303). In one embodiment, the location information includes one or more data packets of a second type corresponding to the second protocol. In one embodiment, the second type of data packets includes UDP data packets.

An assignment for the request can then be generated (operation 304) and communicated to a network of media content providers (operation 305). In one embodiment, all media content providers within the geofence can receive the assignment. In other embodiments, only media content provider users that satisfy two conditions can receive the request (1) their computing device is physically located within the geofence, and (2) the media content provider satisfies the filtering criteria. As discussed above, users further filter media content providers based on user ratings, provider certifications or experience, etc.

In one embodiment, the assignment can be communicated to the media content providers over a third network interface of the server computer that is separate from the first and second network interfaces, and the requested media content entities can be received by the computer server over a fourth network interface, different from the first, second and third network interfaces. This may be advantageous because separate network interfaces enable scaling of the media content services as additional users logon to the computer system. In other embodiments, the same network interface may be utilized for all communications with the computer server.

The assignment can be placed in an assignment feed on the computing devices of the media content providers that satisfy the two conditions. Process 300 continues at operation 306 in FIG. 3B where, once the media content service providers accept the assignment, a notification can be sent to the user computing device when the assignment is accepted. A timer can then be initiated once the request has been accepted in order to monitor the duration of time it takes to complete the request (operation 307). The computer server can then receive the requested media content entities uploaded from a media content provider who accepted the assignment (operation 308), and communicate the requested media content to the user computing device for display in its graphical user interface or other such mechanism (operation 309). Finally, a payment processing service can be accessed for completing the transaction for the media content requests from the user computing device (operation 310).

This completes process 300 in accordance with one example embodiment.

III. Illustrative Graphical Interface Embodiments

FIGS. 4A-4C, 5A-5B, and 6-7 depict various screen shots of a graphical interface having a screen display area 430 on a mobile device in accordance with the techniques described in this disclosure. These embodiments are shown having various graphical elements for users to select or enable various functionality including tabs, selection dialog boxes, drop-down menus, scrolling menus, icons, switches, etc. It should be noted that these are provided for illustrative purposes as persons of skill in the art can readily recognize that the various functionality described in these screen shots can be implemented using additional or different graphical elements.

Figure 4A:
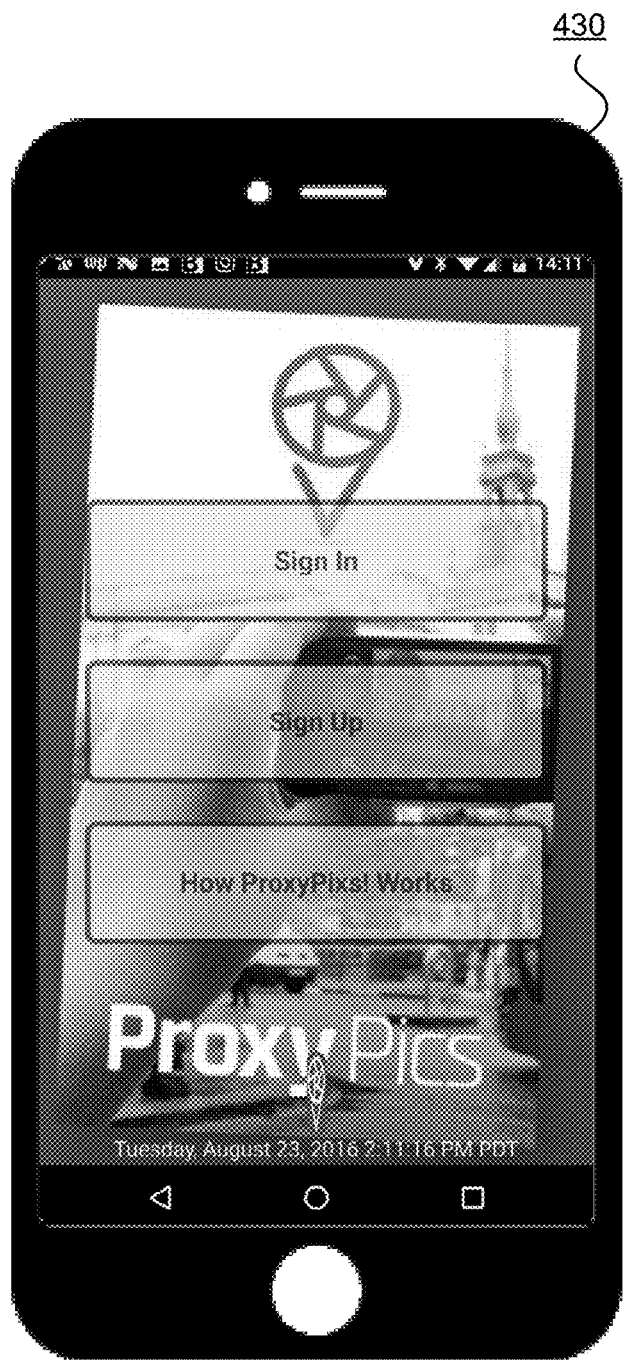
FIGS. 4A-4C depict screen shots of a graphical interface on a mobile device in accordance with the techniques described in this disclosure.

FIG. 4A depicts an embodiment of a landing page 400 for the on-demand media content application when it is first invoked. This page 400 enables users to logon, register for an account on the service, and learn information about how the service works.

Figure 4B:
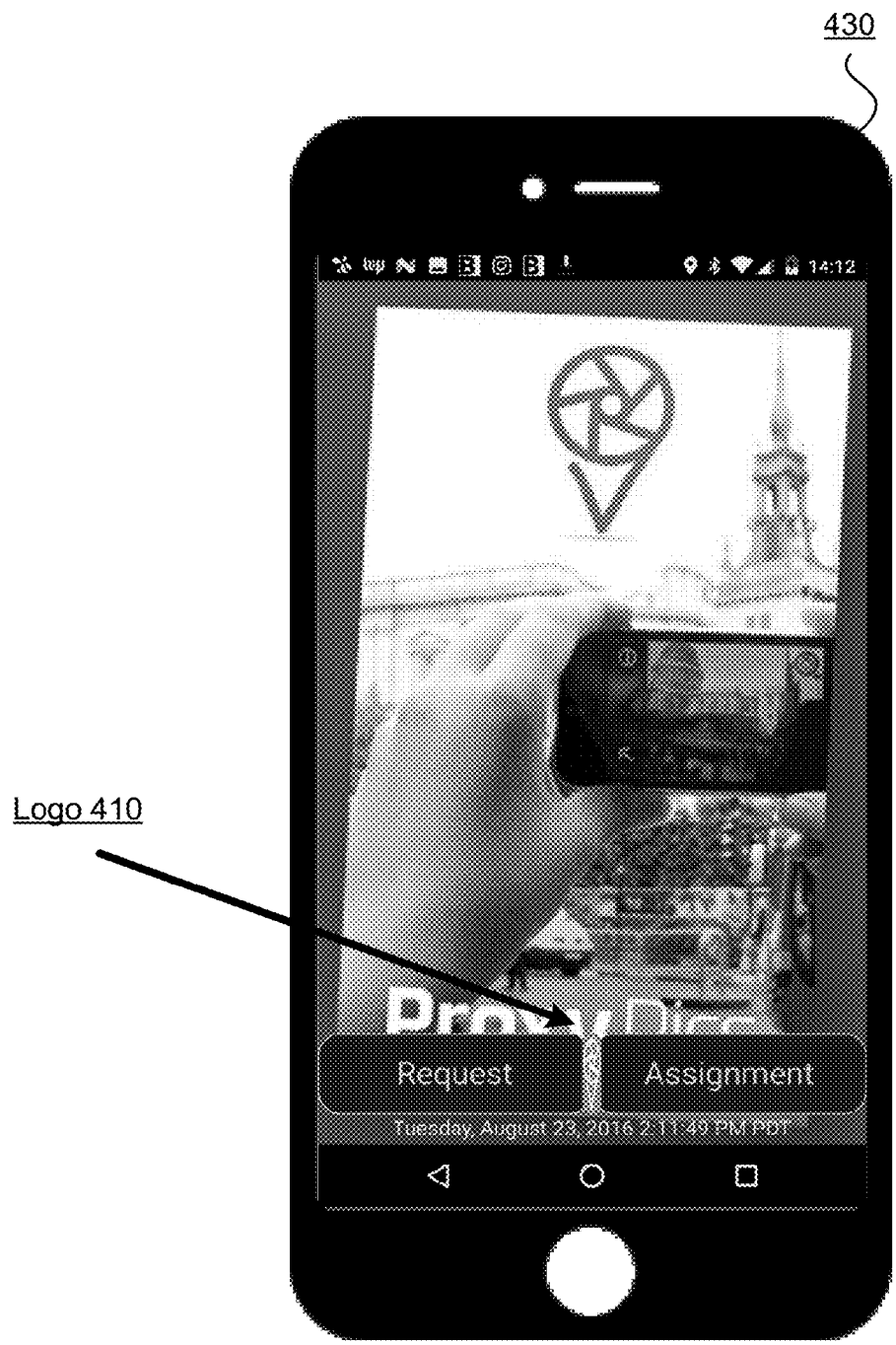

FIG. 4B depicts an embodiment of a mode selection screen 401 for the on-demand content application. This page 401 may be used for users to select either to request media content entities using the service or to browse assignments within their proximity that can be completed by the user. Once the user makes a selection, the user can be assigned as a media content requester or a media content provider.

In one example embodiment, a logo can be provided in the display area 430 of the graphical interface that can be configured to change color as the state of the application changes. The logo can be used as a menu selection button in the display for users to select. For example, when a user selects the logo a menu can be provided with various options for places the user may want to go in the application. By changing the color users can immediately identify where they are at in the menu structure based on the color scheme. For example, a different color can be used when a media content provider user is in the camera mode of the application, etc.

Figure 4C:
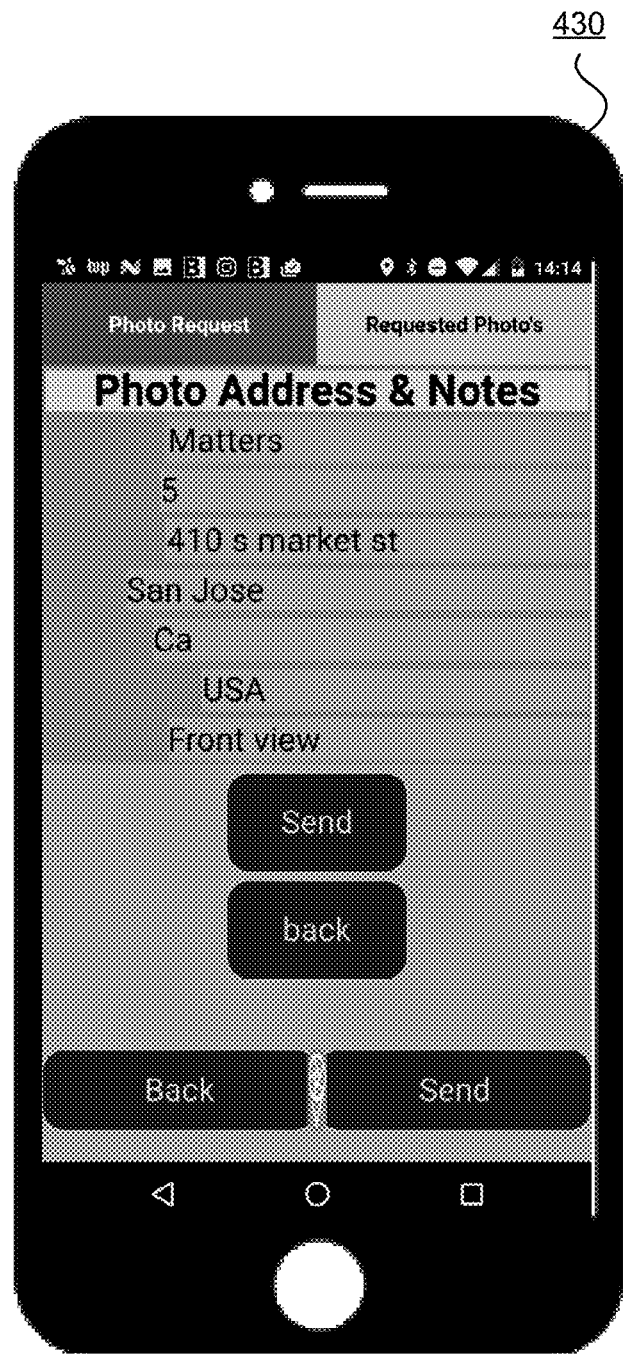

FIG. 4C depicts an embodiment of a photo request page 402 for the on-demand media content application. This page 402 may be used for users to enter the street address, description, and any other information for the location of the subject matter property for a particular media content request. Once the information has been entered, requesting users can use the selection buttons shown in page 402 to send the request to the proxy server in accordance with the techniques described above for on-demand media content capture and delivery services.

Figure 5A:
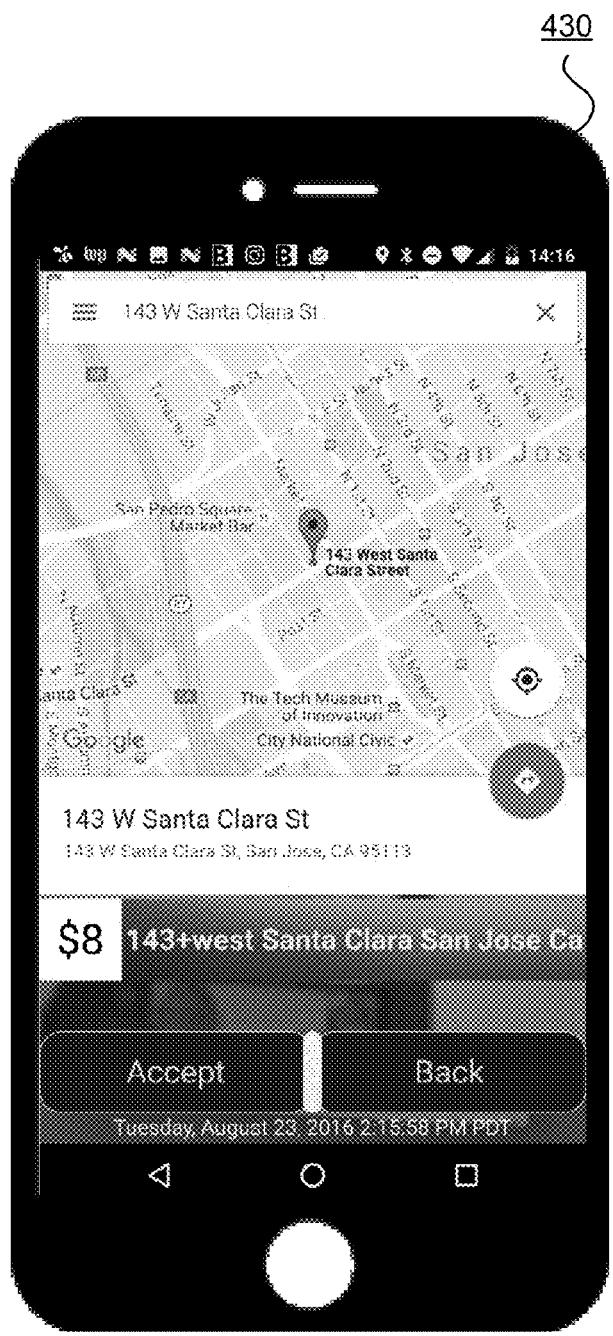
FIGS. 5A-5B depict screen shots of a graphical interface on a mobile device in accordance with the techniques described in this disclosure.

FIG. 5A depicts an embodiment of a photo assignment detail display page 500 for the on-demand media content application. This page 500 can be configured to display a map of the location of the subject property or landmark, etc. corresponding to a request for media content providing users to navigate to the location of the requested subject matter in order to capture it in one or more forms of media including photo, video, and/or audio formats. As discussed above, one or more mapping services may be integrated into the media content application described in this disclosure. The mapping service can provide maps and other location information to the users' computing devices for display within a browser interface as shown, for example, in FIG. 5A. As shown, there is a selection button for media content providers to accept the assignment. The fee to be earned by the media content provider users can also be displayed as shown.

Figure 5B:
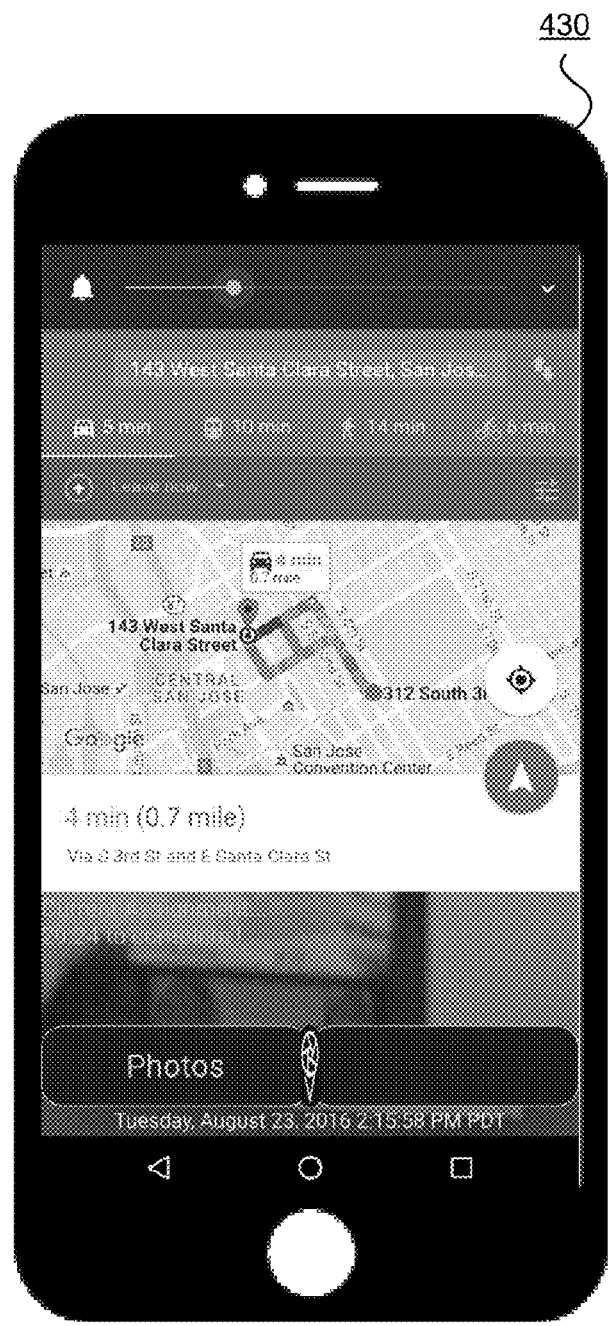

FIG. 5B depicts an embodiment of an assignment accepted page 501 for the on-demand media content application. This page 501 can be configured to show various routes to the subject property of the request on a map displayed in the media content provider's display area 430. There is also a button labeled "Photos" that can be utilized to enter into image and/or video capture mode.

Figure 6:
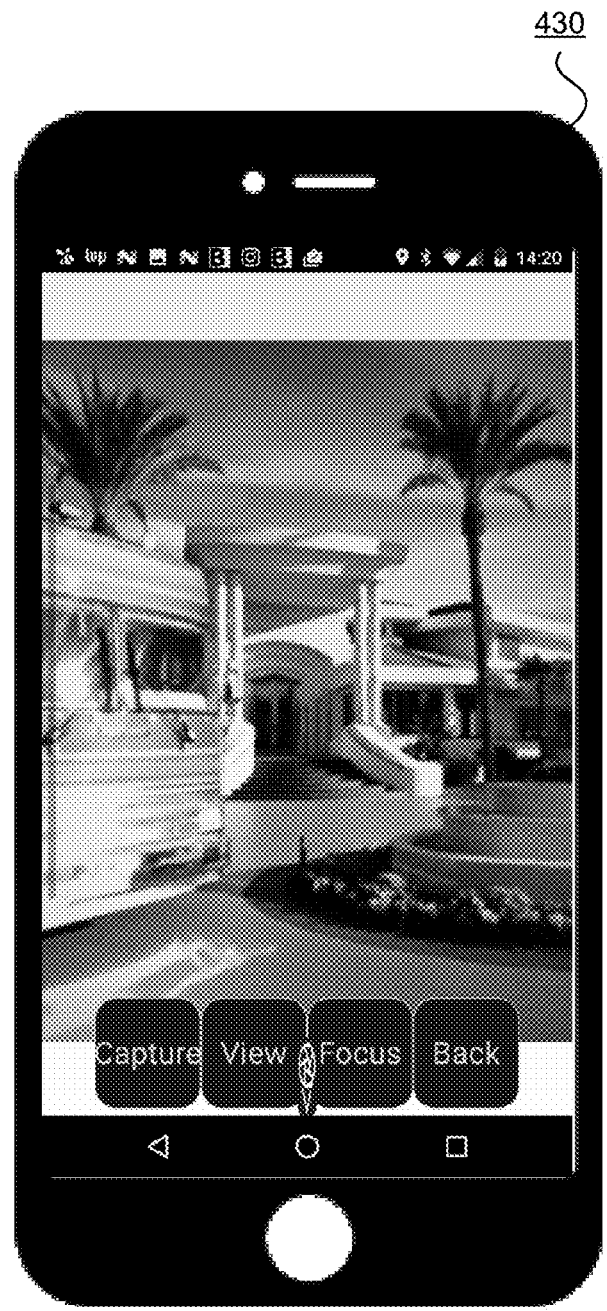
FIGS. 6-7 depict screen shots of a graphical interface on a mobile device in accordance with the techniques described in this disclosure.

FIG. 6 depicts an embodiment of a main camera page 600 for the on-demand media content application. This page 600 can be configured to access the media content provider's camera on his or her computing device (e.g., mobile device) and to display the various image capture options including zooming/panning, image capture, focus, etc. Users can capture images in page 600 and upload those images to the computer server in accordance with the techniques described in this disclosure.

Figure 7:
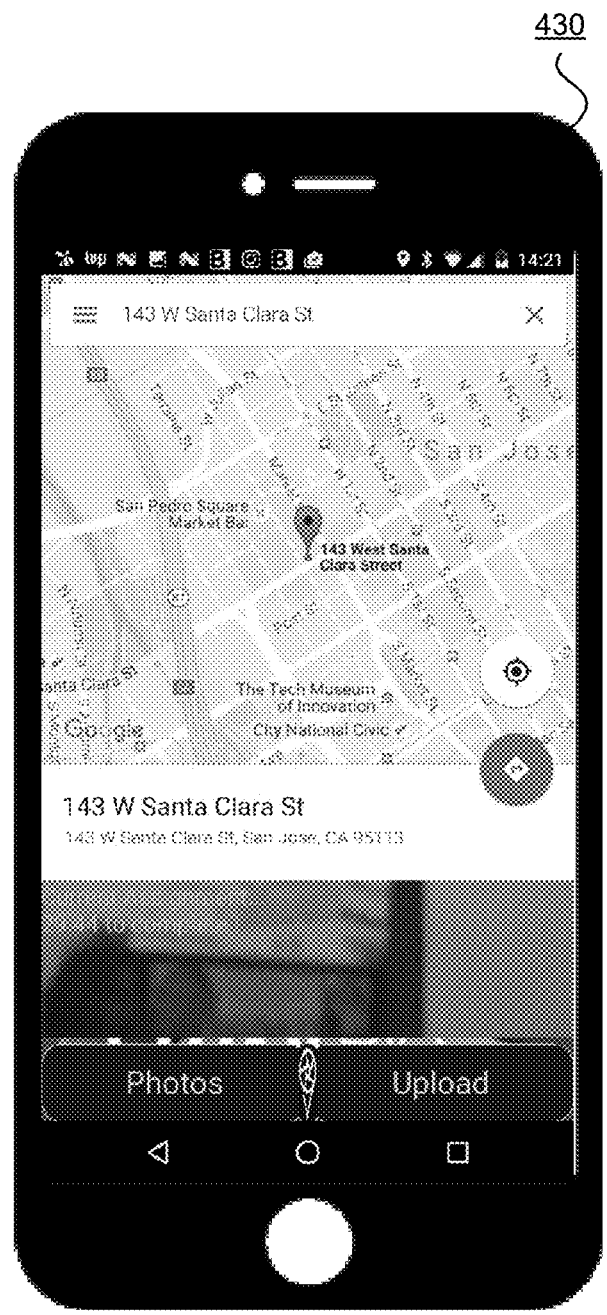

FIG. 7 depicts an embodiment of a photo uploaded page 700 for the on-demand media content application. This page 700 can display the uploaded photo in the display area 430 of the media content provider users' device. Other functionality may display option buttons or other graphical elements (not shown) to the user to select or reject the uploaded media content as appropriate.

IV. Illustrative Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks. FIG. 8 depicts an example overview block diagram of a data processing system upon which the embodiments described in this disclosure may be implemented. The following hardware description is merely one example. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A method for providing on-demand media content services using geolocation information, the method comprising:
   at a computer system in a network, the computer system comprising at least one processor and a memory system in communication with the processor for storing computer code comprising instructions executable by the processor:
   receiving, at a first network interface, a request for one or more entities of media content from a user computing device in communication with the computer system via one or more networks using a first protocol, the request comprising one or more data packets of a first data packet type corresponding to the first protocol, the data packets of the first protocol including address information of the location of subject matter of the media content,
   wherein the request comprises a geofence selected for the subject matter of the media content, a timeframe in which to complete the request, and one or more filtering criteria for media content providers;
   receiving, at a second network interface, separate from the first network interface, location information of the user computing device via one or more networks using a second protocol, the location information comprising one or more data packets of a second type corresponding to the second protocol;
   generating an assignment for the request and communicating the assignment to one or more computing devices of media content providers that satisfy two conditions: (1) the computing device is physically located within the geofence; and (2) the media content provider satisfies the filtering criteria,
   wherein the assignment is placed in an assignment feed on the computing devices of the media content providers satisfying the two conditions;
   receiving the requested media content entities uploaded from a media content provider who accepted the assignment; and
   communicating the requested media content entities to the user computing device for display in graphical user interface.

2. The method of claim 1 wherein the assignment is communicated to the media content providers over a third network interface, separate from the first and second network interfaces, and the requested media content entities are received over a fourth network interface, different from the first, second and third network interfaces.

3. The method of claim 2 wherein separate network interfaces enable scaling of the media content services as additional users logon to the computer system.

4. The method of claim 1 further comprising accessing a payment processing service for completing a transaction for the media content requests from the user computing device.

5. The method of claim 1 further comprising initiating a timer once the request has been accepted in order to monitor the duration of time it takes to complete the request.

6. A computer system for providing on-demand media content services using geolocation information, the system comprising:
   at least one processor;
   one or more databases in communication with the processor via one or more communication networks or links; and
   a memory configured to store programmed computer code executable by the processor to perform operations comprising:

receiving, at a first network interface, a request for one or more entities of media content from a user computing device in communication with the computer system via one or more networks using a first protocol, the request comprising one or more data packets of a first data packet type corresponding to the first protocol, the data packets of the first protocol including address information of the location of subject matter of the media content, wherein the request comprises a geofence selected for the subject matter of the media content, a timeframe in which to complete the request, and one or more filtering criteria for media content providers;

receiving, at a second network interface, separate from the first network interface, location information of the user computing device via one or more networks using a second protocol, the location information comprising one or more data packets of a second type corresponding to the second protocol;

generating an assignment for the request and communicating the assignment to one or more computing devices of media content providers that satisfy two conditions: (1) the computing device is physically located within the geofence; and (2) the media content provider satisfies the filtering criteria, wherein the assignment is placed in an assignment feed on the computing devices of the media content providers satisfying the two conditions;

receiving the requested media content entities uploaded from a media content provider who accepted the assignment; and communicating the requested media content entities to the user computing device for display in graphical user interface.

7. The computer system of claim 6 wherein the assignment is communicated to the media content providers over a third network interface, separate from the first and second network interfaces, and the requested media content entities are received over a fourth network interface, different from the first, second and third network interfaces.

8. The computer system of claim 7 wherein separate network interfaces enable scaling of the media content services as additional users logon to the computer system.

9. The computer system of claim 6 wherein the operations further comprise accessing a payment processing service for completing a transaction for the media content requests from the user computing device.

10. The computer system of claim 6 wherein the operations further comprise initiating a timer once the request has been accepted in order to monitor the duration of time it takes to complete the request.

11. A non-transitory computer readable storage medium storing programmed computer code executable by a computer system comprising at least one processor and a memory in communication with the processor, the operations comprising:

receiving, at a first network interface, a request for one or more entities of media content from a user computing device in communication with the computer system via one or more networks using a first protocol, the request comprising one or more data packets of a first data packet type corresponding to the first protocol, the data packets of the first protocol including address information of the location of subject matter of the media content, wherein the request comprises a geofence selected for the subject matter of the media content, a timeframe in which to complete the request, and one or more filtering criteria for media content providers;

receiving, at a second network interface, separate from the first network interface, location information of the user computing device via one or more networks using a second protocol, the location information comprising one or more data packets of a second type corresponding to the second protocol;

generating an assignment for the request and communicating the assignment to one or more computing devices of media content providers that satisfy two conditions: (1) the computing device is physically located within the geofence; and (2) the media content provider satisfies the filtering criteria, wherein the assignment is placed in an assignment feed on the computing devices of the media content providers satisfying the two conditions;

receiving the requested media content entities uploaded from a media content provider who accepted the assignment; and communicating the requested media content entities to the user computing device for display in graphical user interface.

12. The computer readable storage medium of claim 11 wherein the assignment is communicated to the media content providers over a third network interface, separate from the first and second network interfaces, and the requested media content entities are received over a fourth network interface, different from the first, second and third network interfaces.

13. The computer readable storage medium of claim 12 wherein separate network interfaces enable scaling of the media content services as additional users logon to the computer system.

14. The computer readable storage medium of claim 11 wherein the operations further comprise accessing a payment processing service for completing a transaction for the media content requests from the user computing device.

15. The computer readable storage medium of claim 11 wherein the operations further comprise initiating a timer once the request has been accepted in order to monitor the duration of time it takes to complete the request.

* * * * *